__United States Patent Office__

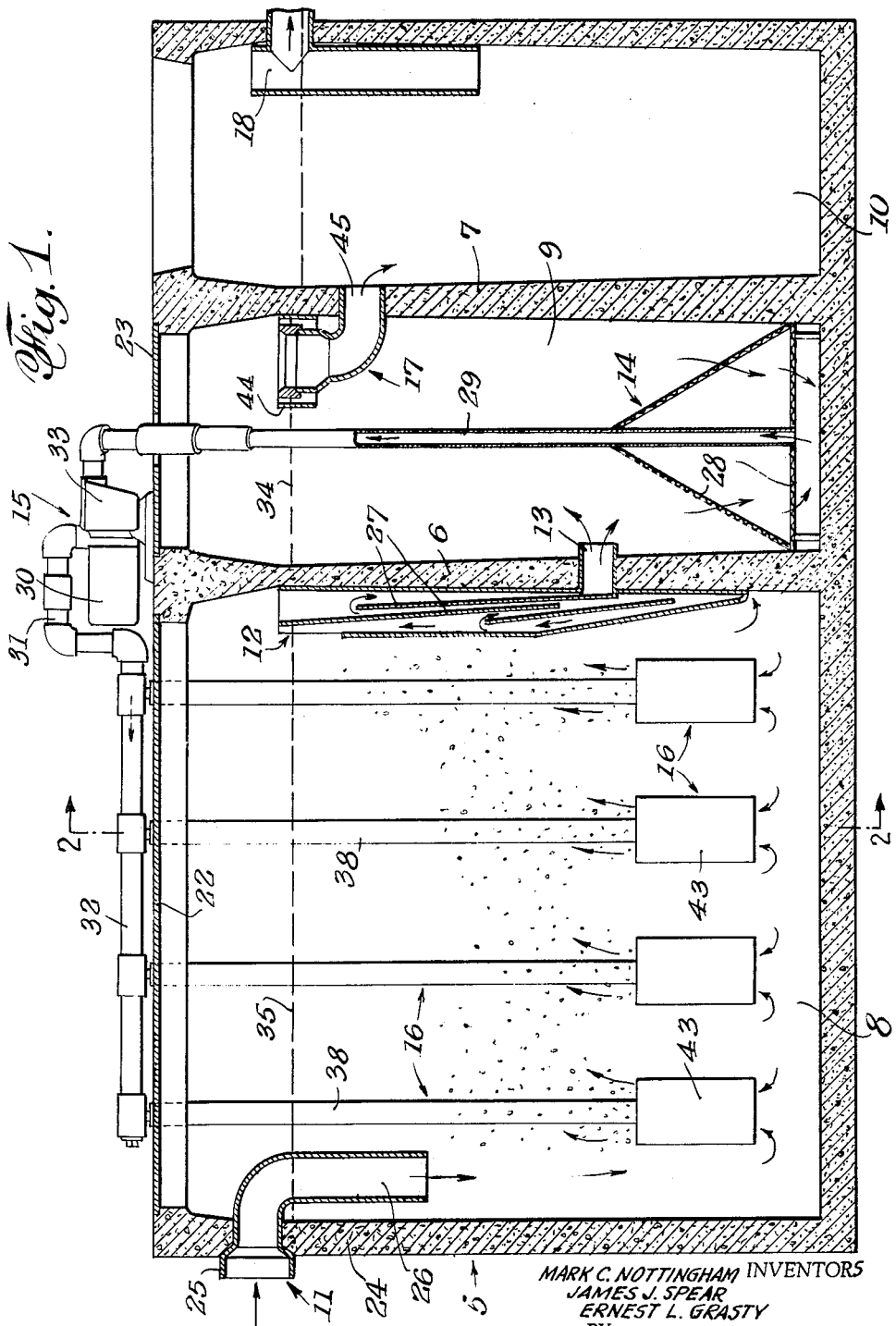

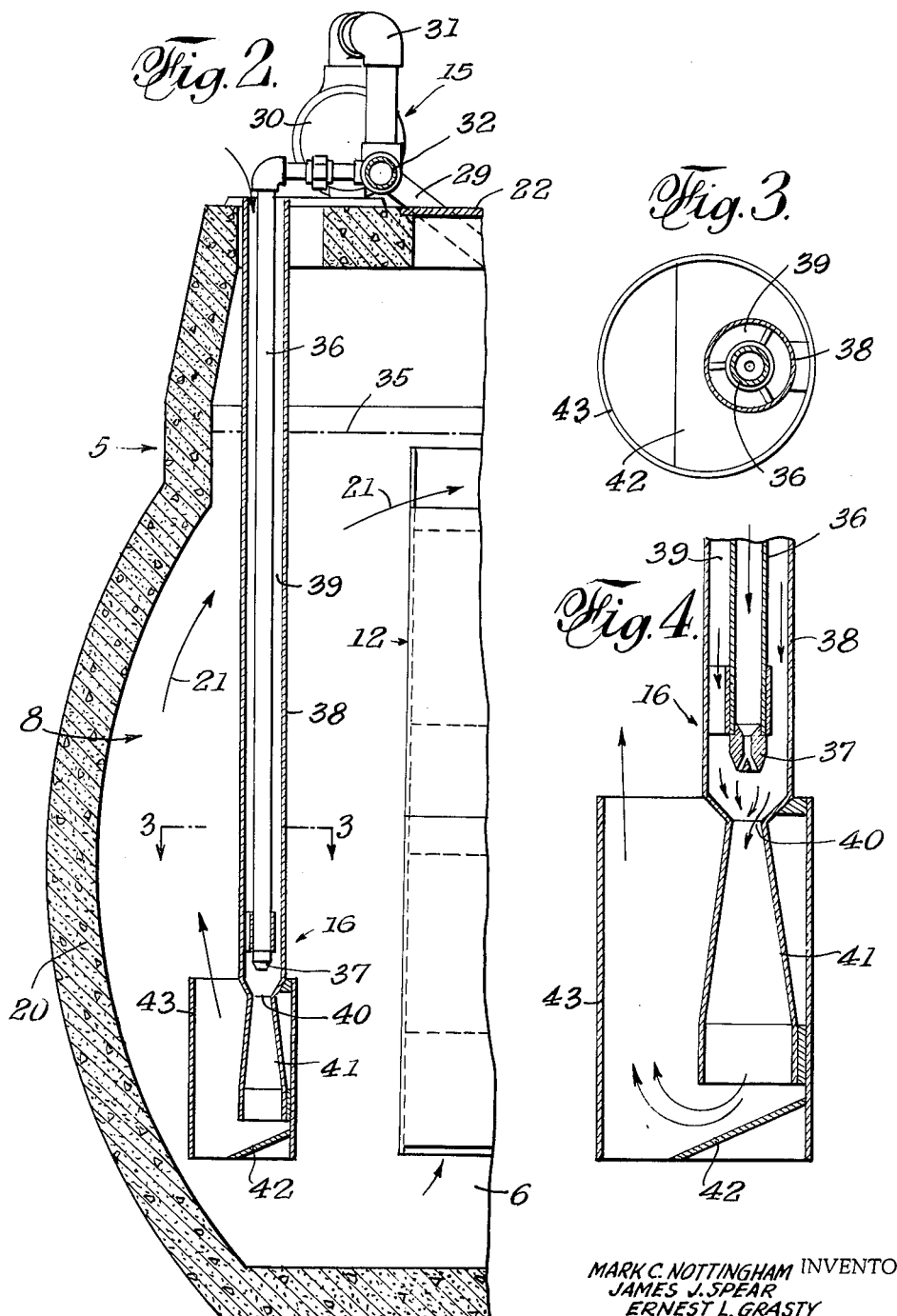

3,206,032
Patented Sept. 14, 1965

3,206,032
SEWAGE DISPOSAL TANK
Mark C. Nottingham, Temple City, James J. Spear, Newport Beach, and Ernest L. Grasty, West Covina, Calif., assignors to M. C. Nottingham Co. of Temple City, Los Angeles, Calif., a corporation of California
Filed June 24, 1963, Ser. No. 289,843
6 Claims. (Cl. 210—195)

This invention relates to a sewage disposal tank and process, and has for an object to provide a novel and improved process for effecting introduction of air into influent sewage by means of a return flow of settled-out sewage material to, thereby, render purification of said influent sewage more effective by action of aerobic bacteria, or other forms of germ life contained in said air.

Another object of the invention is to provide a process of sewage aeration, for purification purposes, that is carried out by generating air bubbles in the flow of settled-out sewage material to provide a wide-spread dissemination of air, i.e., oxygen, in the influent sewage liquid.

A further object of the invention is to generate such air bubbles by a Venturi action that draws the air from atmosphere.

A still further object of the invention is to provide a sewage disposal tank embodying a plurality of air-bubble generating devices that utilize Venturi force to draw atmospheric air into sewage influent and then disperse said air as bubbles that accompany the influent to a settling chamber prior to discharging the liquid as an effluent of said tank.

This invention also has for its objects to provide a novel, economical and convenient method or process of superior utility, and to provide apparatus that is positive in operation, convenient in use, easily installed in working position and easily disconnected therefrom, economical of manufacture relatively simple, and of general superiority and serviceability.

The invention also contemplates novel combinations of method steps as well as novel details of construction and novel combinations and arrangements of parts, which will appear more fully in the course of the following description, which is based on the accompanying drawings. However said drawings merely show and the following description, merely describes, the invention with respect to a preferred method and apparatus, the same, nevertheless, being given by way of illustration or example only.

In the drawings, like reference characters designate similar parts in the several views.

FIG. 1 is a longitudinal sectional view of a flow-through sewage disposal tank embodying the apparatus of the present invention.

FIG. 2 is an enlarged vertical sectional view of one side of said tank and taken on the line 2—2 of FIG. 1.

FIG. 3 is a further enlarged cross-sectional view as taken on the line 3—3 of FIG. 2.

FIG. 4 is a vertical sectional view of the means shown in FIG. 3.

The sewage disposal tank that is illustrated comprises, generally, a tank 5 having partitions 6 and 7 that divide the tank into an aeration chamber 8, a settling or clarification compartment 9 and a sludge retention compartment 10, an influent inlet 11 to the aeration chamber 8, baffle means 12 in the far end of the chamber 8 from the inlet 11 and terminating in a flow pipe 13 that discharges into the clarification compartment 9, a settling and return unit 14 in the clarification compartment, a pump unit 15 disposed on top of the tank for return of fluid-borne solids from the unit 14 in said compartment 9 to the aeration chamber 8, a plurality of aeration units 16 fed with solids containing return fluid by the pump unit 15 and embodying means for oxidation of the solids in said fluid, an outlet 17 from the compartment 9 to the compartment 10, and an effluent outlet 18 from the latter compartment.

The tank 5, with its partitions 6 and 7, may be a cast concrete container. As seen in FIG. 2, the side walls 20 of said tank are bulged, not only for strength but to improve the circulation through the sewage material being treated, of air bubbles generated by the aeration units 16, as suggested by the arrows 21 of FIG. 2. In practice, the aeration chamber 8 may be provided with a removable cover 22, with the clarification compartment 9 similarly provided with a cover 23.

The inlet 11 for influent flow is provided on an end wall 24 of the tank, the same being shown as a fitting having a horizontal bell end 25 for the discharge end of an inlet pipe, and a downwardly directed leg 26 that discharges influent into the aeration chamber 8 in a downward direction. It is this discharge that is aerated by the units 16.

The baffle means 12 is shown as mounted on the partition 6 and is formed to restrict the flow of large particles or masses in the influent material to the clarification compartment 9 through the pipe 13. The several baffle walls 27, therefore, provide for retention of the solids in the chamber 8 so the oxidation effects produced by the units 16 may effectively treat and purify the same.

The settling and return unit 14 is shown as having foraminous walls 28 that pass relatively small particles that are in the flow reaching the compartment 9, the flow, with said smaller particles, moving upwardly in a pipe 29 which is connected to the inlet of the pump unit 15. From time to time, residual harder and larger particles or masses of solid matter may be removed from the compartment 9 to clear the unit 14 for efficient operation.

It will be noted that the inlet 13 from the chamber 8 to the compartment 9 is at a point intermediate the top and bottom of said compartment, that the settling of the liquid in said compartment takes place in the lowermost portion of said compartment, and that the outlet 17 from said compartment is located in the upper portion thereof.

The pump unit 15 comprises a lift pump 30 of sufficient power to lift the material in pipe 29 and to force the same, under pressure of fifteen to twenty p.s.i., through a pressure pipe 31 that terminates in a manifold pipe 32. The latter is horizontally disposed above the aeration chamber 8. The flow from pipe 29 passes through a strainer 33 that intercepts solids in the flow that are too large to pass through the pump 30.

Although the same are not shown, a skimmer for the liquid level 34 in the clarification compartment 9 and a spray for the froth at the liquid level 35 created by the aeration of the liquid in chamber 8, may be operated by said pressure in manifold 32. The same may be provided but do not form part of the present invention.

Four aeration units 16 are shown, but the number thereof may vary according to the size and flow capacity of the tank and the degree of oxidation action desired. Each unit 16 is shown as a pipe 36 that is connected at its upper end to the manifold pipe 32 and is provided at its lower end with a jet or nozzle 37, an air tube 38 around the pipe 36 and affording an annular passage 39 that is open at the top and is formed at its lower end with a constriction or throat 40 into which the jet 37 discharges. A flaring pipe extension 41 from the throat, together with the lower end of tube 38, comprises a Venturi tube that, because of a pressure reduction in said throat, induces a velocity in said tube 38 that draws air from the atmosphere to become intermixed with the spray discharge of jet 37.

The aerated mixture of fluid material discharging from the lower end of extension 41 is directed against a deflection plate 42 that is carried by an up-draft tube 43. As the liquid jet strikes the liquid at the bottom of the extension 41, the air that is being drawn down by the Venturi action becomes mixed with the liquid in small bubbles. The liquid and air mixture strikes the deflection plate 42 and is deflected upwardly in the tube 43. Since this air-included liquid is lighter than the liquid outside the up-draft tube, the same moves upwardly, drawing liquid in the bottom of the chamber 8 to be drawn into the up-draft tube 43. This up-draft flow is deflected, as before mentioned, by the curved tank wall 20, providing an efficient circulation of the liquid that induces a wide spreading of the air bubbles throughout the liquid contents of the chamber 8.

In the above manner, the purification of the influent sewage is effected by an efficient incorporation, in the form of small bubbles, of air into the liquid and highly effective action of aerobic bacteria due to the increased up-draft circulation induced by the present aeration units 16 under control of a flow under force of a single pump.

The bubble-containing flow reaches the compartment 9 through the baffle means 12, as before described, and, being lighter than the liquid in said compartment, overflows the weir 44 into the outlet fitting 45 of the outlet 17. Hence, only liquid from which most of the solids have been removed and which has been effectively purified will enter the sludge retention compartment 10 from which the same overflows through the effluent outlet 18. Such small residual particles as may remain in the liquid will settle as undisturbed sludge in the bottom of said compartment 10.

As will be realized, there may be several re-circulations of the liquid between the chamber 8 and compartment 9, assuring efficient purification by aeration, as hereinbefore described.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of method and apparatus that may fall within the scope of the appended claims.

Having thus described the invention, what is claimed and desired to be secured by Letters Patent is:

1. A flow-through sewage disposal tank comprising:
   (a) an influent sewage chamber,
   (b) a clarification compartment,
   (c) baffle means between said chamber and the clarification compartment to intercept the larger particles in the sewage and restrict the flow thereof from said chamber, said baffle means having a plurality of solids-retaining walls and being provided with an outlet pipe adjacent to the lower portion thereof and opening into the clarification compartment.
   (d) a plurality of aerating units disposed in the influent sewage chamber, and
   (e) means to direct a flow of settled sewage from the lower portion of the clarification compartment to said aeration units to aerate the sewage in said chamber.

2. A flow-through sewage disposal tank according to claim 1 in which each aeration unit comprises:
   (a) a nozzle to create a liquid jet,
   (b) an air tube open at the top to atmosphere, and
   (c) a Venturi tube receiving the jet flow and drawing air downwardly in the air tube to commingle with the jet flow.

3. A flow-through sewage disposal tank according to claim 1 in which each aeration unit comprises:
   (a) a nozzle to create a liquid jet,
   (b) an air tube open at the top to atmosphere,
   (c) a Venturi tube receiving the jet flow and drawing air downwardly in the air tube to commingle with the jet flow, and
   (d) means to deflect the aerated jet flow to produce a circulation of the liquid in the sewage chamber and a dissemination of the air in the form of bubbles, throughout said liquid.

4. A flow-through sewage disposal tank comprising:
   (a) an influent sewage chamber,
   (b) a clarification compartment,
   (c) baffle means between said chamber and the clarification compartment to intercept the larger particles in the sewage and restrict the flow thereof from said chamber, said baffle means having a plurality of solids-retaining walls and being provided with an outlet pipe adjacent to the lower portion thereof and opening into the clarification compartment,
   (d) a plurality of aerating units disposed in the influent sewage chamber,
   (e) means to direct a flow of settled sewage from the lower portion of the clarification compartment to said aeration units to aerate the sewage in said chamber, and
   (f) an overflow discharge of liquid from the upper portion of the clarification compartment.

5. A flow-through sewage disposal tank comprising:
   (a) an influent sewage chamber,
   (b) a clarification compartment,
   (c) baffle means between said chamber and the clarification compartment to intercept the larger particles in the sewage and restrict the flow thereof from said chamber, said baffle means having a plurality of solids-retaining walls and being provided with an outlet pipe adjacent to the lower portion thereof, and opening into the clarification compartment,
   (d) a plurality of aerating units disposed in the influent sewage chamber,
   (e) means to direct a flow of settled sewage from the lower portion of the clarification compartment to said aeration units to aerate the sewage in said chamber,
   (f) an overflow discharge of liquid from the upper portion of the clarification compartment,
   (g) a sludge-retaining compartment receiving said discharge, and
   (h) an overflow discharge from the latter compartment.

6. A flow-through sewage disposal tank comprising:
   (a) an influent sewage chamber,
   (b) a clarification compartment,
   (c) baffle means between said chamber and the clarification compartment to intercept the larger particles in the sewage and direct the remainder into the clarification compartment,
   (d) a plurality of aerating units disposed in the influent sewage chamber, and
   (e) means to direct a flow of settled sewage from the lower portion of the clarification compartment to said aeration units to aerate the sewage in said chamber,
(f) the tank comprising a unitary receptacle provided with a partition wall dividing the receptacle into said chamber and compartment, and
(g) the baffle means being mounted on the chamber side of the partition with an outlet pipe therefrom extending through the partition for conducting the mentioned remainder of the flow that is directed into the clarification compartment.

References Cited by the Examiner
UNITED STATES PATENTS

| | | | |
|---|---|---|---|
| 1,286,775 | 12/18 | Rein et al. | 210—194 |
| 2,879,144 | 3/59 | Thornton | 23—270.5 |

FOREIGN PATENTS 514,627 11/39 Great Britain.

MORRIS O. WOLK, *Primary Examiner.*